UNITED STATES PATENT OFFICE.

EDWARD BEANES, OF LONDON, ENGLAND.

IMPROVED MODE OF TREATING ANIMAL CHARCOAL.

Specification forming part of Letters Patent No. 43,748, dated August 2, 1864.

*To all whom it may concern:*

Be it known that I, EDWARD BEANES, of London, England, have invented a new and useful Improvement in Treating Animal Charcoal; and I do hereby declare that the following is a full, clear, and exact description thereof, which will enable others skilled in the art to fully understand and use the same.

This invention relates to an additional improvement to a patent granted to me April 5, 1864, and numbered 42,156. This patent describes the use of hydrochloric-acid and chlorine gas in treating animal charcoal for the purpose of removing or facilitating the removal of such impurities which deprive said charcoal of its decolorizing and absorptive properties, or whereby said properties are deteriorated. Since the issue of said patent I have found that other chemical compounds—such, for instance, as nitrate of ammonia, nitrous acid, hyponitric acid, and carbonic acid—produce the same or a similar effect as hydrochloric-acid or chlorine gas.

This present improvement therefore consists in treating animal charcoal which has lost its decolorizing and absorptive properties with such chemical compounds, which, like hydrochloric-acid or chlorine gas, have the power of removing or rendering soluble the lime and other earthy, metallic, and alkaline substances with which it is contaminated. The compounds which I use for this purpose are chloride of ammonia—commonly called "sal-ammoniac"—or such other chlorides, either in the liquid or solid state, when brought in contact with the contaminated animal charcoal, will form soluble compounds with the lime and other impurities. I also use nitrate of ammonia, nitrous acid, hyponitric acid, and carbonic acid. The effect of all these substances is to render the lime and other metallic, earthy, and alkaline impurities soluble, so that the same can afterward be removed by washing.

I claim as new and desire to secure by Letters Patent—

The employment or use in treating animal charcoal with such other chemical compounds besides chlorine or hydrochloric-acid gas, which, when brought in contact with the contaminated coal, will form soluble compounds with the lime and other metallic, earthy, and alkaline impurities contained therein, so that the same can be washed out and the original decolorizing and absorptive properties of the coal are restored.

EDWD. BEANES.

Witnesses:
J. P. HALL,
M. M. LIVINGSTON.